US010640377B2

(12) United States Patent
Sutto et al.

(10) Patent No.: US 10,640,377 B2
(45) Date of Patent: May 5, 2020

(54) METHOD FOR PREPARING CLEAN INSULATING SINGLE OR FEW SHEETS OF TOPOLOGICAL INSULATORS USING AN IONIC LIQUID

(71) Applicant: The Government of the United States of America, as represented by the Secretary of the Navy, Arlington, VA (US)

(72) Inventors: Thomas E. Sutto, Woodbridge, VA (US); Amy Ng, Alexandria, VA (US); Nabil D. Bassim, Silver Spring, MD (US); Todd H. Brintlinger, Washington, DC (US); Michael S. Osofsky, Clarksville, MD (US); Rhonda Michele Stroud, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/855,023

(22) Filed: Dec. 27, 2017

(65) Prior Publication Data
US 2018/0186640 A1  Jul. 5, 2018

Related U.S. Application Data

(60) Provisional application No. 62/440,517, filed on Dec. 30, 2016.

(51) Int. Cl.
*C01B 19/04* (2006.01)
*H01B 17/56* (2006.01)

(52) U.S. Cl.
CPC ............ *C01B 19/04* (2013.01); *H01B 17/56* (2013.01); *C01P 2002/08* (2013.01); *C01P 2004/24* (2013.01); *C01P 2006/40* (2013.01); *C01P 2006/80* (2013.01)

(58) Field of Classification Search
None
See application file for complete search history.

(56) References Cited

U.S. PATENT DOCUMENTS

| 2010/0019207 A1* | 1/2010 | Kumta | B82Y 30/00 252/506 |
| 2015/0004733 A1* | 1/2015 | Wang | C01B 19/007 438/54 |

FOREIGN PATENT DOCUMENTS

KR   2012094628   *   2/2011

OTHER PUBLICATIONS

Ludwig, Thomas et al. "Mechanism of Bismuth Telluride . . . ". American Chemical Society. 2015 (Year: 2015).*

(Continued)

*Primary Examiner* — Sheng H Davis
(74) *Attorney, Agent, or Firm* — US Naval Research Laboratory; Rebecca L. Forman

(57) ABSTRACT

A method to produce high quality single or a few atomic layers thick samples of a topological insulating layered dichalcogenide. The overall process involves grinding layered dichalcogenides, adding them to an ionic liquid, and then using a mechanical method to cause intercalation of the ionic liquid into the van der Waals (VDW) gap between the layers of the metal chalcogenide.

10 Claims, 10 Drawing Sheets

(56) References Cited

OTHER PUBLICATIONS

Ren et al., "Large-scale production of ultrathin topological insulator bismuth telluride nanosheets by a hydrothermal intercalation and exfoliation route," J. Mater. Chem., 22, 4921-4926 (2012).

Teweldebrhan et al., "Exfoliation and Characterization of Bismuth Telluride Atomic Quintuples and Quasi-Two_Dimensional Crystals," Nano Lett., 10, 1209-1218 (2010).

Goyal et al., "Mechanically-exfoliated stacks of thin films of $Bi_2Te_3$ topological insulators with enhanced thermoelectric performance," Appl. Phys. Lett., 97, 133117 (2010).

Hong et al., "Ultrathin Topological Insulator $Bi_2Se_3$ Nanoribbons Exfoliated by Atomic Force Microscopy," Nano Lett., 10, 3118-3122 (2010).

* cited by examiner

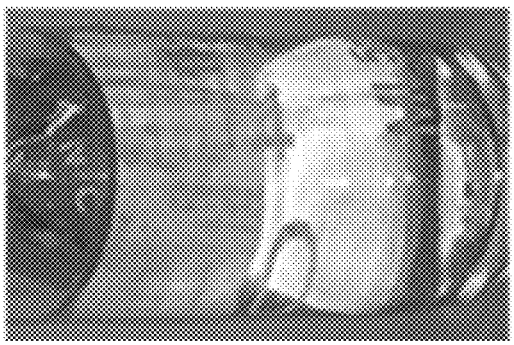
FIG. 3A
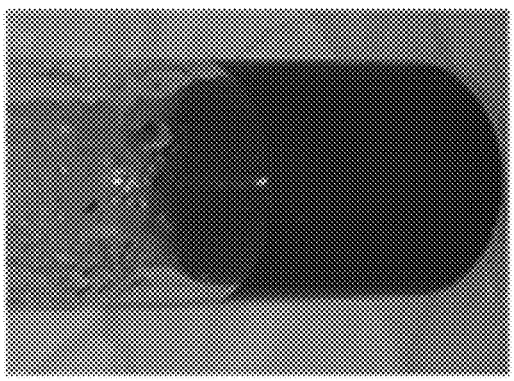
FIG. 3B
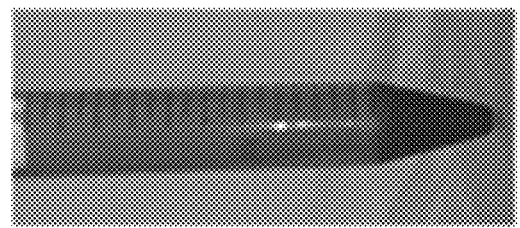
FIG. 3C
FIG. 3D

METHOD FOR PREPARING CLEAN INSULATING SINGLE OR FEW SHEETS OF TOPOLOGICAL INSULATORS USING AN IONIC LIQUID

PRIORITY CLAIM

The present application is a non-provisional application claiming the benefit of U.S. Provisional Application No. 62/440,517 filed on Dec. 30, 2016 by Thomas E. Sutto et al., entitled "METHOD FOR PREPARING CLEAN INSULATING SINGLE OR FEW SHEETS OF TOPOLOGICAL INSULATORS USING AN IONIC LIQUID," the entire contents of which is incorporated herein by reference.

BACKGROUND OF THE INVENTION

Field of the Invention

The present invention relates to using ionic liquids to exfoliate single or several atomic layers of topological insulators to prepare clean, insulating sheets of the topological insulator.

Description of the Prior Art

Topological insulators are increasingly being studied for their application to spintronic devices and other types of electrical or optical devices. The two classical topological insulators, $Bi_2X_3$, where X=Se or Te in whole number combinations as shown here $Bi_2Se_3$, $Bi_2Te_3$, $BiTeSe_2$ or $BiSeTe_2$, are in bulk supposed to be insulating materials. However, the general synthesis of these materials results in samples that are metallically conductive due to the presence of Bi in the van der Waals gap (the gap separating one section of the crystal structure with the next). This essentially shorts out the bulk material, rendering it not a topological insulator but rather a metal. Past methods have focused primarily on using a mechanical tape method to remove single layers of the material, but this method is difficult to translate into an industrial application. Additionally, this method of using tape also brings along with the sample multiple fragments with the sheets, rather than a clean single sheet.

Another commonly used method is sonication induced exfoliation, which results in the formation of nanosheets of very small size in terms of their surface area. Current chemical methods of exfoliating 2D materials are extremely limited, primarily due to the need for the use of high powered sonication (typically on the order of megajoules of energy), which significantly reduces the utility of the 2D materials due to significant reduction of the sheet's overall surface area. Development of a true chemical means for exfoliation without high energy sonication would be a significant step in developing devices using these unique materials.

BRIEF SUMMARY OF THE INVENTION

The present invention provides a method to produce high quality single or a few atomic layers thick samples of a topological insulating layered dichalcogenide $Bi_2X_3$, where X is Se or Te. The overall process involves grinding layered dichalcogenides, adding them to an ionic liquid, and then using a mechanical method to cause intercalation of the ionic liquid into the van der Waals (VDW) gap between the layers of the metal chalcogenide.

This chemical technique allows for the rapid and consistent preparation of single or a few layers of the topological insulators, free of many of the fragments observed by the mechanical method. More importantly, during the exfoliation process the Bi defect atoms between the layers are removed, allowing for ideal topological insulating behavior. Another advantage is that by using lower power sonication, larger sheets can be prepared rather than nanosheets of material that form during high energy sonication. Larger sheets, such as those obtained from larger crystals, significantly aid in the development and preparation of devices. Additionally, this technique could more easily be adapted by industry for the preparation of electronic materials based on topological insulators. One more advantage is that this technique will likely be applicable to the general exfoliation of other layered materials to produce single or several atomically thick layers for other applications.

These and other features and advantages of the invention, as well as the invention itself, will become better understood by reference to the following detailed description, appended claims, and accompanying drawings.

BRIEF DESCRIPTION OF THE DRAWINGS

FIGS. 3A-3D show a photographic presentation of reaction and purification steps. FIG. 3A shows pure ionic liquid. FIG. 3B shows ionic liquid after micro-stirring with $Bi_2X_3$. FIG. 3C shows after allowing to settle, the volume of the $Bi_2X_3$ is significantly greater (it was just a thin layer of metal dust initially). FIG. 3D shows the remaining material after centrifugation but prior to resuspension in an organic solvent.

FIG. 7A shows a lower magnification view, and FIG. 7B shows a higher magnification complement.

FIG. 8A shows a lower magnification view, and FIG. 8B shows a higher magnification complement.

DETAILED DESCRIPTION OF THE INVENTION

Figure 1:
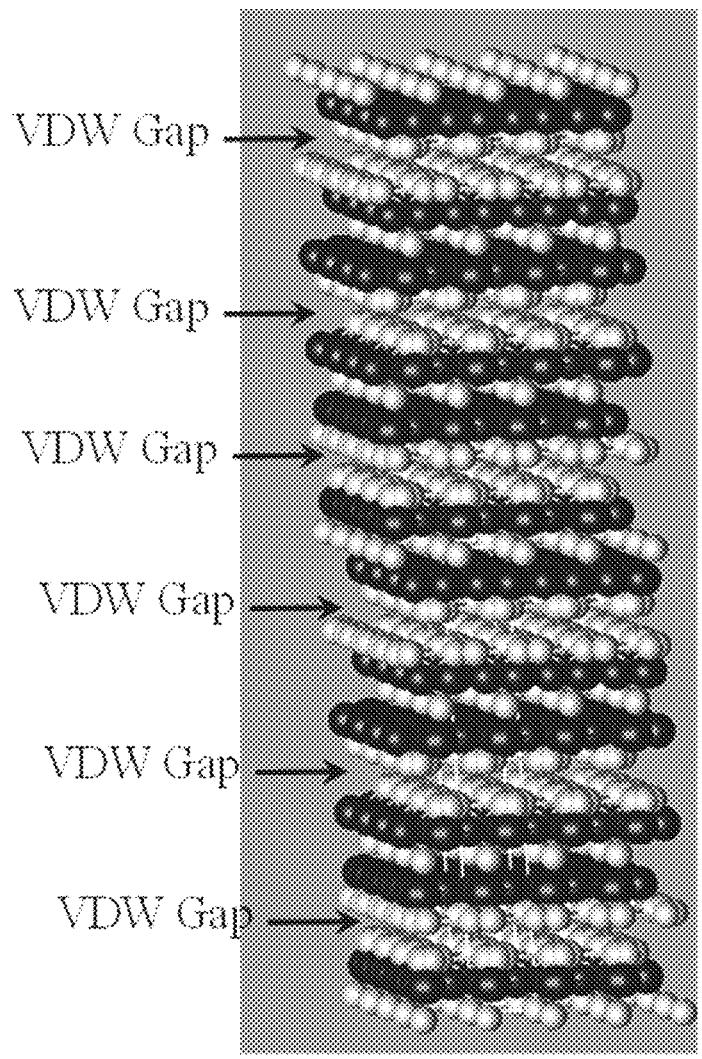
FIG. 1 shows the structure of $Bi_2X_3$, where X is Se or Te. The dark atoms are Bi, and the light atoms are Se or Te. VDW gaps indicate where the shearing of the layered material will occur.

The overall goal of the present invention is to produce high quality single or a few atomic layers thick samples of the topological insulating layered dichalcogenide $Bi_2X_3$, where X is Se or Te. The overall process involves first grinding the layered dichalcogenides, adding them to an ionic liquid, and then using a mechanical method to cause intercalation of the ionic liquid into a van der Waals (VDW) gap between the layers of the metal chalcogenide. FIG. 1 shows the structure of the $Bi_2X_3$ compounds, with arrows indicating the VDW gap.

Figure 2:
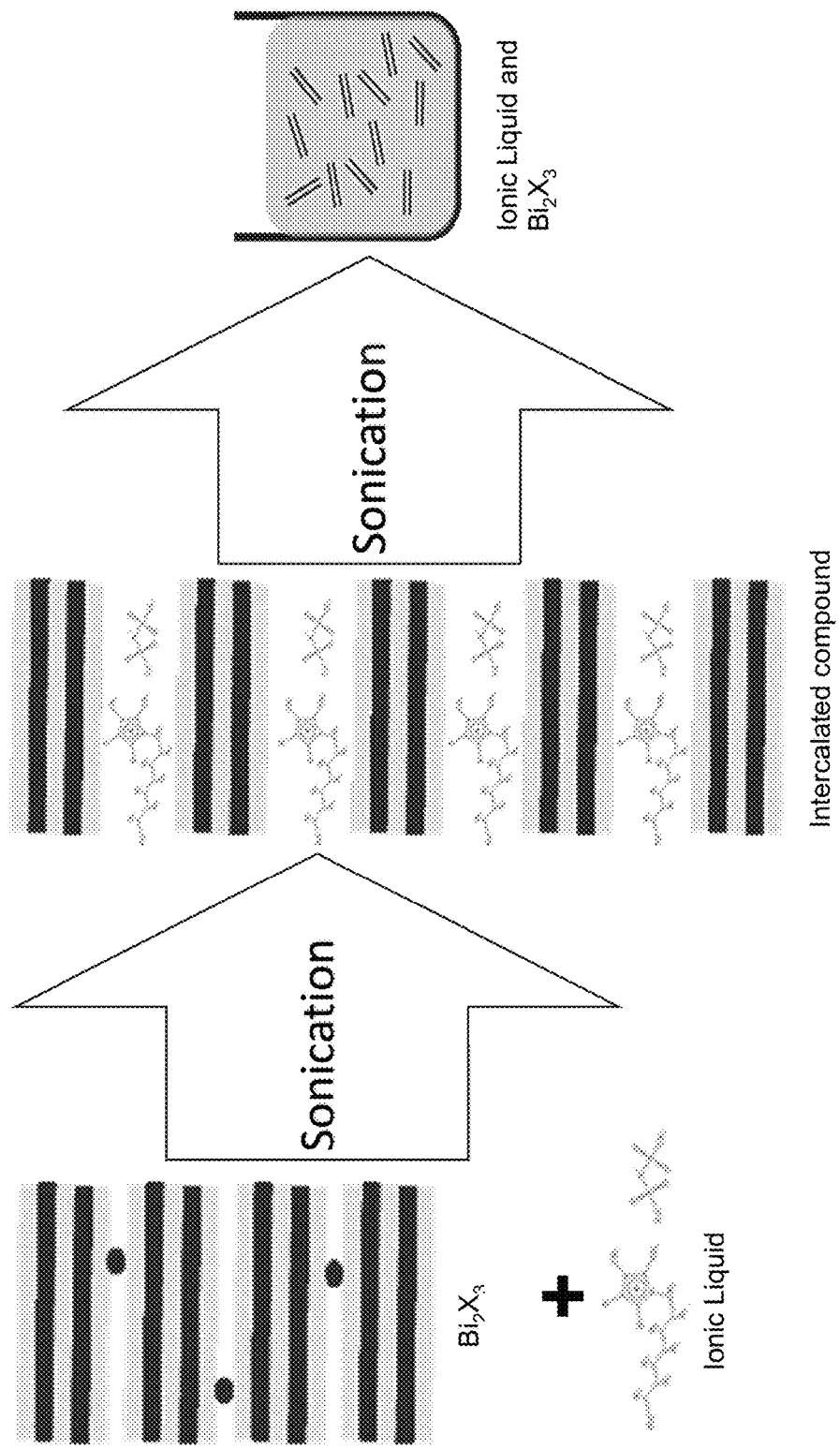
FIG. 2 is a schematic representation of the exfoliation reaction.

According to the present invention, an ionic liquid is combined with a vibrational interaction such as micro stirring and weak sonication (less than 20 joules of energy as opposed to typical mega-joules or energy), or simple heat and stirring to initiate intercalation of the ionic liquid into layered topological dichalcogenide insulators. Although this work focuses on the $Bi_2X_3$ topological insulators, it is likely applicable to other types of layered topological insulators, such as $Bi_2Sb_2$, or $SmB_6$. The chemical pathway leading to exfoliation is shown graphically in FIG. 2. In the structural schematic of $Bi_2X_3$, the gray lines indicate sheets of X, while the black lines indicate sheets of Bi. Each unit cell of $Bi_2X_3$ is composed of two sheets of Bi sandwiched between 3 sheets of X. The van der Waals gap where intercalation occurs is where two x layers meet. The dark circles represent the defect Bi atoms between sheets shoring out the insulating nature of the material. In the reaction between the $Bi_2X_3$ and ionic liquid, the ionic liquid is added, and then the solution is sonicated/blended. Initially, the ionic liquid inserts itself between the layers into the van der Waal gaps. At completion, the individual sheets of the layered material come apart completely in the solution. These single sheets are then defect free and no longer have Bi between layers shorting out the insulating nature of the material.

These solutions of layered material and the ionic liquid are allowed to react for 24 hours to several days, and then centrifuged and washed with acetonitrile or other solvent in which the ionic liquid is soluble but the layered material is not. After centrifugation, the remaining material is then re-suspended in an organic solvent. A small aliquot of this is then subjected to additional cleaning in an organic solvent prior to characterization by TEM to confirm the formation of clean sheets of the material. FIGS. 3A-3D show a photographic presentation of the different reaction and purification steps. The ionic liquid is clear color less fluid (FIG. 3A), then the dichalcogenide is added and sonicated (FIG. 3B). After this, the solution appears black with the suspended layered material (FIG. 3C). Methanol (MeOH) is then added and the solution is centrifuged (FIG. 3D) and the solid material washed several times to remove the ionic liquid.

Figure 4A:
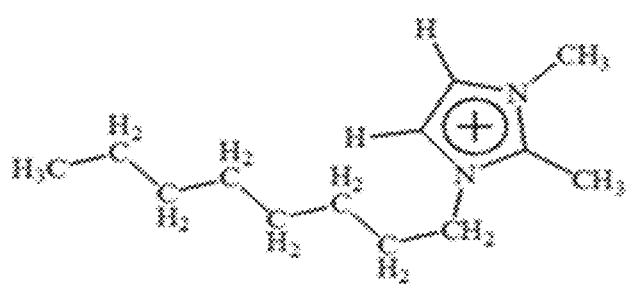
FIG. 4A shows the chemical structure for a 1,2-dimethyl-3-octylimidazolium cation.
Figure 4B:
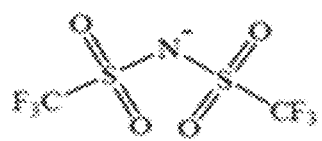
FIG. 4B shows the chemical structure for a bis(trifluoromethanesulfonyl)imide anion. This cation and anion can be paired to use as an ionic liquid.
Figure 5:
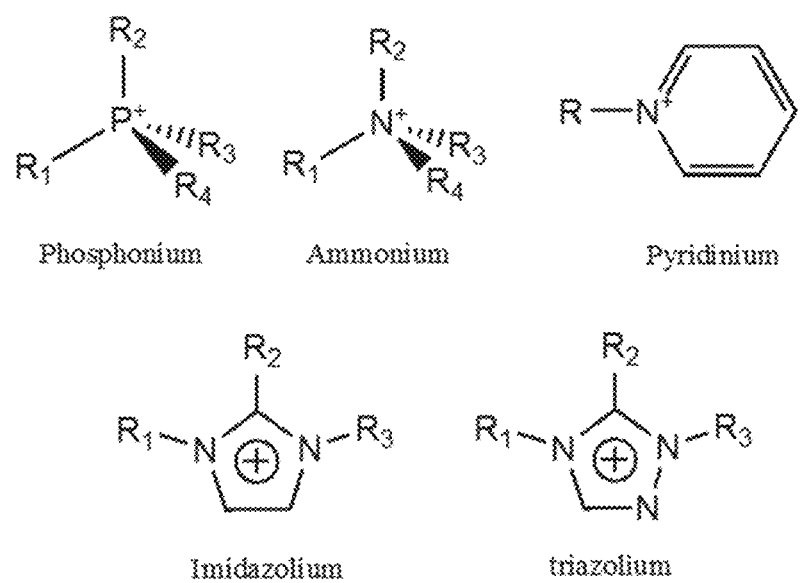
FIG. 5 shows the general structure of some possible cations to be used in the ionic liquid.
Figure 6:
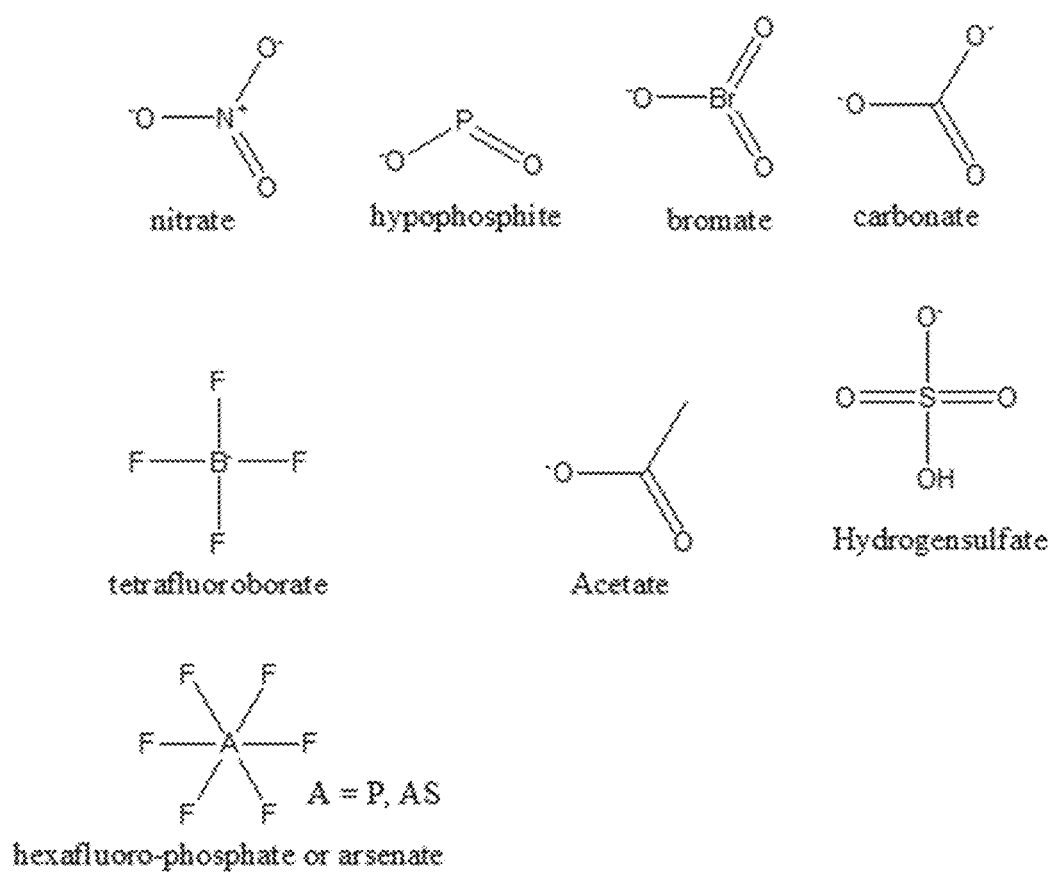
FIG. 6 shows the general structure of some possible anions to be used in the ionic liquid.

For the ionic liquid, a tri-substituted imidazolium cation (1,2-dimethyl-3-octylimidazolium (FIG. 4A)) paired with a hydrophobic anion, bis(trifluoromethanesulfonyl)imide (FIG. 4B), can be used. Using a hydrophobic ionic liquid, especially one with a flat aromatic positively charged imidazolium ring allows for a non-aqueous method for performing the initial intercalation that results in ultimately, exfoliation. Many other ionic liquids based on general cations (FIG. 5) and anions (FIG. 6) will also work.

Figures 7A, 7B:
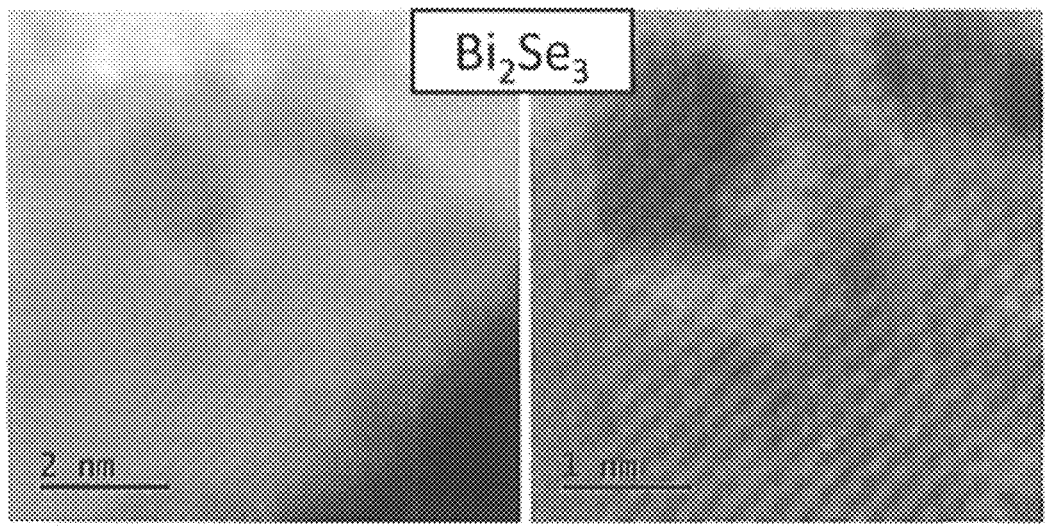
FIGS. 7A and 7B show TEM results of the topological insulator prepared comprising $Bi_2Se_3$.
Figure 7C:
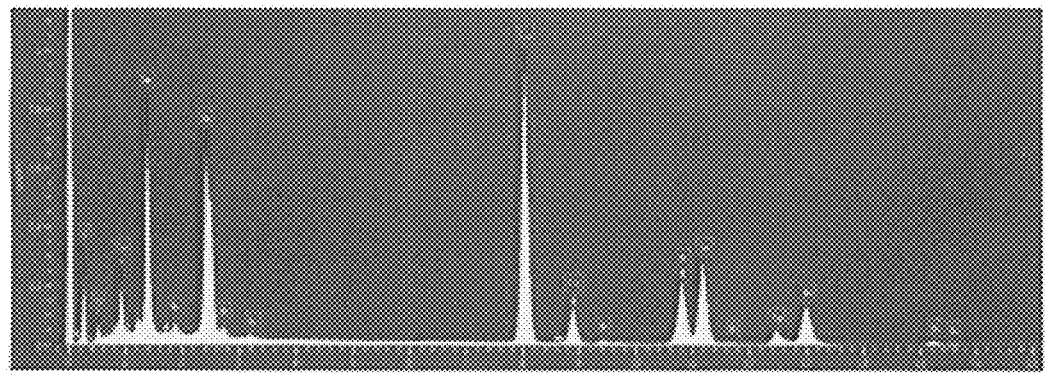
FIG. 7C shows an energy dispersive spectrum of the topological insulator prepared comprising $Bi_2Se_3$.
Figures 8A, 8B:
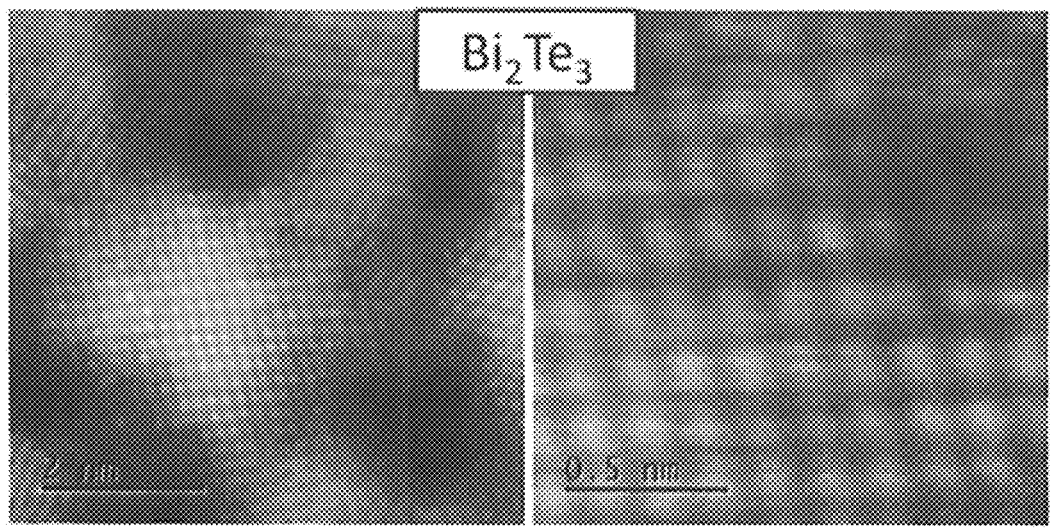
FIGS. 8A and 8B show TEM results of the topological insulator prepared comprising $Bi_2Te_3$.
Figure 8C:
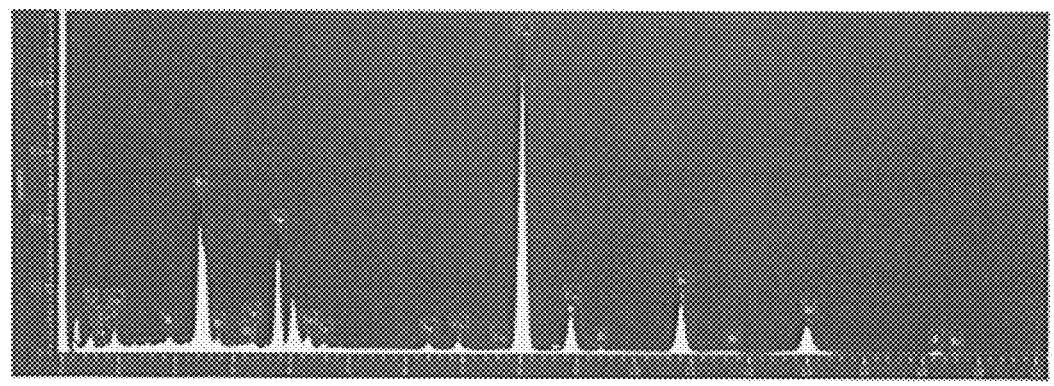
FIG. 8C shows an energy dispersive spectrum of the topological insulator prepared comprising $Bi_2Te_3$.

FIGS. 7A and 7B show the TEM results of the topological insulator prepared using $Bi_2Se_3$. FIG. 7A shows a lower magnification view, while FIG. 7B shows a higher magnification complement. Likewise FIGS. 8A and 8B show the TEM results of the topological insulator prepared using $Bi_2Te_3$. FIG. 8A shows a lower magnification view, while FIG. 8B shows a higher magnification complement. Higher resolution scans show clean sheets of the materials. The TEM images were obtained using a Nion UltraSTEM 200, a microscope that has the ability to resolve 80 pm details, operating at 60 keV accelerating voltage. FIGS. 7C and 8C show an energy dispersive spectrum showing the elemental composition of the material (using $Bi_2Se_3$ for FIG. 7C and using $Bi_2Te_3$ for FIG. 8C).

Figure 9:
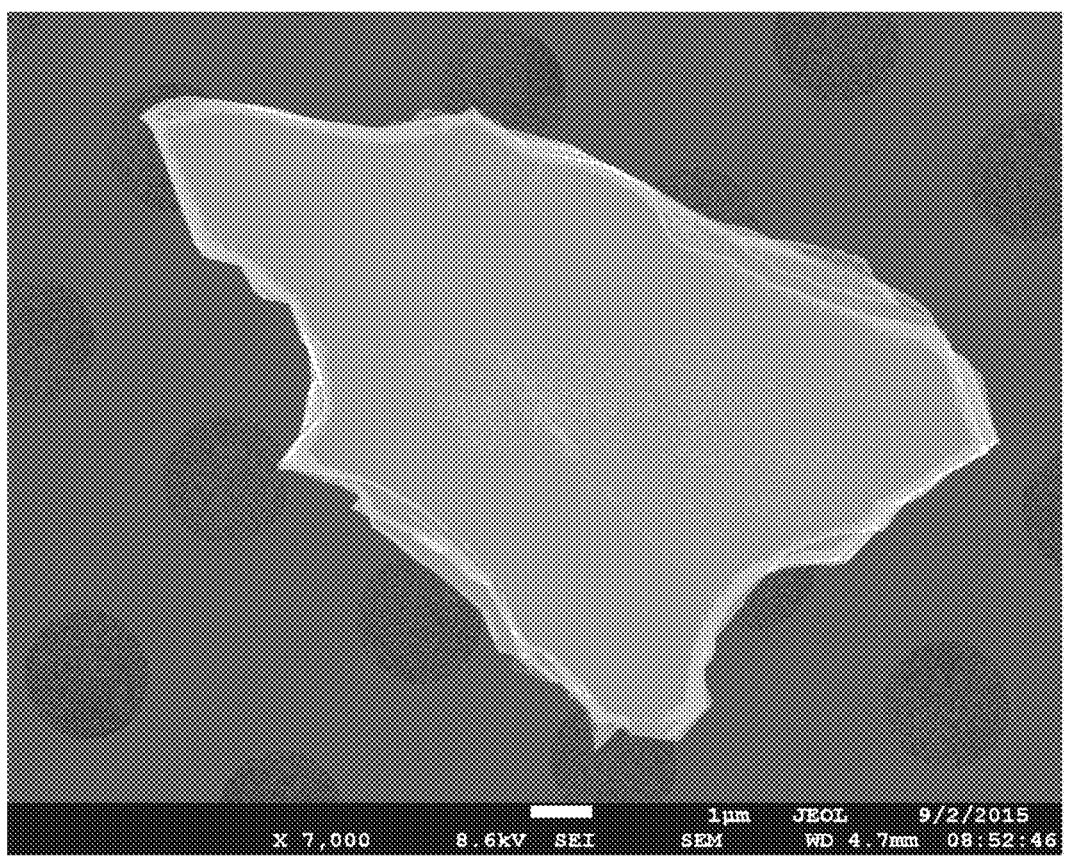
FIG. 9 shows SEM size analysis of sheets prepared using $Bi_2Se_3$.
Figure 10:
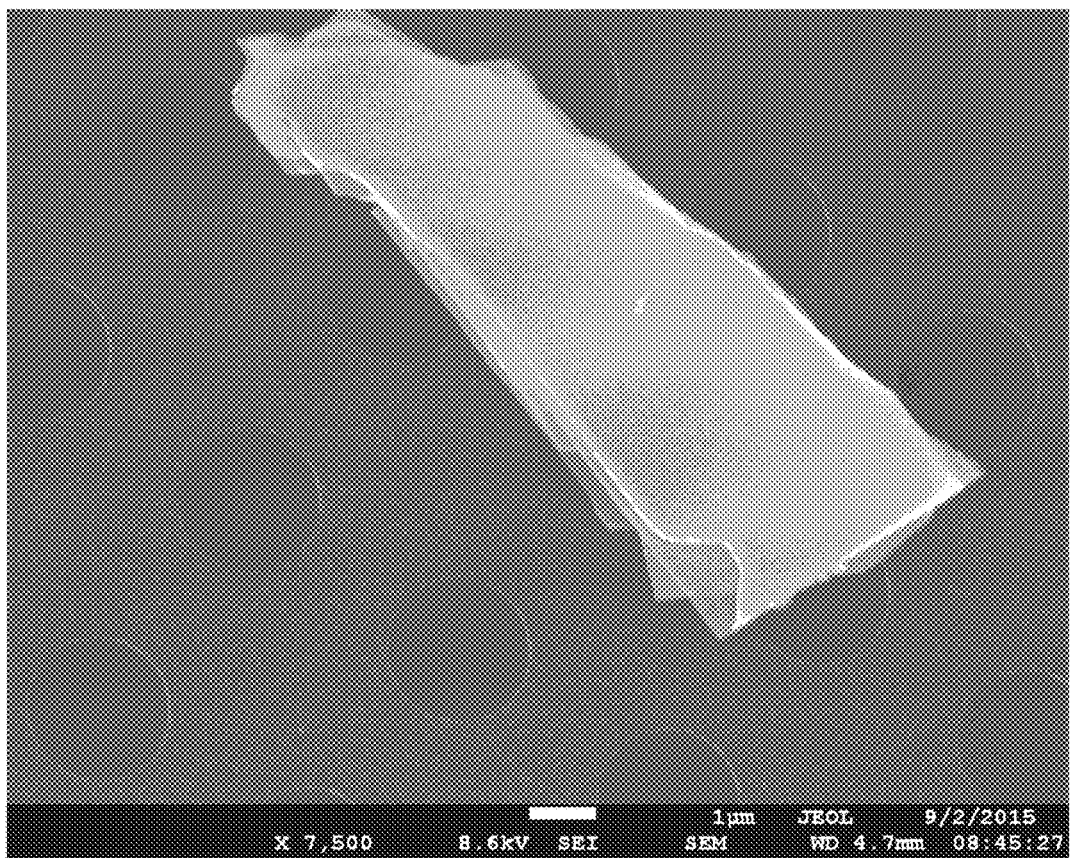
FIG. 10 shows SEM size analysis of sheets prepared using $Bi_2Te_3$.

FIG. 9 shows the SEM size analysis of sheets prepared using $Bi_2Se_3$. As shown in FIG. 9, the size of the sheets is about 38 sq. microns. FIG. 10 shows the SEM size analysis of sheets prepared using $Bi_2Te_3$. As shown in FIG. 10, the size of the sheets is about 36 sq. microns.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method for preparing clean, insulating sheets of a topological insulator, comprising:
   adding a layered dichalcogenide to an ionic liquid, wherein the dichalcogenide comprises bismuth, and wherein the ionic liquid comprises 1,2-dimethyl-3-octylimidazolium paired with bis(trifluoromethanesulfonyl)imide;
   using a mechanical method to cause intercalation of the ionic liquid into a van der Waals gap between the layers of the dichalcogenide; and
   continuing the mechanical method to cause an individual sheet of the layered dichalcogenide to break apart or to cause a few sheets of the layered dichalcogenide to break apart with no bismuth remaining between the layers.

2. The method of claim 1, wherein the layered dichalcogenide is $Bi_2X_3$, where X is Se or Te.

3. The method of claim 1, wherein the mechanical method comprises a vibrational interaction.

4. The method of claim 1, wherein the mechanical method comprises micro stirring and sonication of less than 20 joules of energy.

5. The method of claim 1, wherein the mechanical method comprising stirring and applying heat.

6. Insulating sheets of a topological insulator made by the method, comprising:
   adding a layered dichalcogenide to an ionic liquid, wherein the dichalcogenide comprises bismuth, and wherein the ionic liquid comprises 1,2-dimethyl-3-octylimidazolium paired with bis(trifluoromethanesulfonyl)imide;
   using a mechanical method to cause intercalation of the ionic liquid into a van der Waals gap between the layers of the dichalcogenide; and
   continuing the mechanical method to cause an individual sheet of the layered dichalcogenide to break apart or to cause a few sheets of the layered dichalcogenide to break apart with no bismuth remaining between the layers.

7. The insulating sheets of a topological insulator of claim 6, wherein the layered dichalcogenide is $Bi_2X_3$, where X is Se or Te.

8. The insulating sheets of a topological insulator of claim 6, wherein the mechanical method comprises a vibrational interaction.

9. The insulating sheets of a topological insulator of claim 6, wherein the mechanical method comprises micro stirring and sonication of less than 20 joules of energy.

10. The insulating sheets of a topological insulator of claim 6, wherein the mechanical method comprising stirring and applying heat.

\* \* \* \* \*